(12) United States Patent
Park

(10) Patent No.: US 6,676,303 B2
(45) Date of Patent: Jan. 13, 2004

(54) SYSTEM FOR ASSEMBLING WDM FILTER ASSEMBLY FOR OPTICAL AMPLIFIER

(75) Inventor: Joong-Wan Park, Suwon (KR)

(73) Assignee: Samsung Electronics Co., Ltd. (KR)

( * ) Notice: Subject to any disclaimer, the term of this patent is extended or adjusted under 35 U.S.C. 154(b) by 45 days.

(21) Appl. No.: 10/027,555

(22) Filed: Oct. 22, 2001

(65) Prior Publication Data

US 2002/0114569 A1 Aug. 22, 2002

(30) Foreign Application Priority Data

Feb. 21, 2001 (KR) .......................................... 2001-8744

(51) Int. Cl.[7] .................................................. G02B 6/32
(52) U.S. Cl. .............................. 385/88; 385/52; 385/90
(58) Field of Search .............................. 385/52, 88, 90, 385/92; 359/159; 398/84, 85

(56) References Cited

U.S. PATENT DOCUMENTS

| | | | | |
|---|---|---|---|---|
| 5,506,920 A | * | 4/1996 | Suemura et al. | 385/25 |
| 6,343,166 B1 | * | 1/2002 | Hellman et al. | 385/31 |
| 6,418,250 B1 | * | 7/2002 | Corbosiero et al. | 385/24 |

* cited by examiner

*Primary Examiner*—David V. Bruce
*Assistant Examiner*—Therese Barber
(74) *Attorney, Agent, or Firm*—Duane Morris LLP

(57) ABSTRACT

A system of assembling a WDM filter assembly including a filter assembly and a collimator includes a holding means for accepting and holding one of the filter assembly and the collimator, a pivotal means for pivotally moving one which of the filter assembly and the collimator is not held, a detecting means for detecting a signal going through the WDM filter assembly, and a control means for applying a driving signal to drive the pivotal apparatus by using a pin to offset the interference between materials until the detected siganl is within a predetermined process tollerance, whereby the filter assembly is aligned with the collimator.

15 Claims, 5 Drawing Sheets

SYSTEM FOR ASSEMBLING WDM FILTER ASSEMBLY FOR OPTICAL AMPLIFIER

CROSS REFERENCE

This application claims the benefit of Korean Patent Application No. 2001-8744, filed on Feb. 21, 2001, under 35 U.S.C. §119, the entirety of which is hereby incorporated by reference.

BACKGROUND OF THE INVENTION

1. Field of the Invention

The present invention relates to a system of assembling a wavelength-division multiplexing (WDM) filter assembly for optical amplifier.

2. Description of Related Art

Recent technology development of an information-communication industry makes it possible to transmit large amounts of data over a long distance in a short time. A wavelength-division multiplexing (WDM) has been developed which is a data transmission method that transmits a light signal having several wavelengths through respective optical fiber constituting a cable. The WDM uses the existing cable network but shows such effect as install a new cable network. Also, a WDM filter for use in such a WDM is recently developed.

There are many methods to align the WDM filter. A manual rotational alignment is usually used. An automatic rotational alignment is tried but has some limitations due to material's tolerances.

The WDM filter assembly includes a filter assembly and a collimator. The filter assembly and the collimator are manufactured in separate process and then assembled. When assembled, an alignment between the filter assembly and the collimator is very important. For example, if the filter assembly is not accurately aligned with the collimator, it is difficult to expect a desirable performance of the WDM filter.

To obtain the desirable performance of the WDM filter, the filter assembly and the collimator are temporally assembled, and then are aligned with each other until a signal having wanted characteristics is output. Thereafter, the filter assembly and the collimator are firmly assembled by an adhesive.

For more detail, in the state that filter assembly and the collimator are temporally assembled, a laser is applied to the collimator. A wavelength that passes through the filter assembly and the collimator is detected, and an operator manually rotates either of the filter assembly and the collimator in consideration of a detected result until a desirable characteristic is detected. When the desirable characteristic is detected, an alignment between the filter assembly and the collimator is completed. Then, the filter assembly and the collimator stick to each other.

In order to overcome problems due to the manually aligning method described above, developed is recently an alignment technique which forcibly grips and rotates the filter assembly by using a gripper comprised of a rubber belt to align with the collimator fixed.

However, such an alignment technique has the following disadvantages: it is difficult to control a tension of the belt when the gripper rotates the filter assembly and a tension is asymmetry in rotational direction. It takes a long time to set the belt around an outer surface of the filter assembly. And since the filter assembly is forcibly rotated in disregard of a manufacturing tolerance of the filter assembly and the collimator, a lens of the collimator may be damaged.

SUMMARY OF THE INVENTION

To overcome the problems described above, preferred embodiments of the present invention provide a system of assembling a WDM filter assembly having a short alignment time.

It is another object of the present invention to provide a system of assembling a WDM filter assembly which can prevent parts of the WDM filter assembly from being damaged.

It is a still object of the present invention to provide a system of assembling a WDM filter assembly that can provide an accurate alignment.

In order to achieve the above object, the preferred embodiments of the present invention provide a system of assembling a WDM filter assembly including a filter assembly and a collimator. The system includes a holding means for accepting and holding one of the filter assembly and the collimator, a pivotal means for pivotally moving one which of the filter assembly and the collimator is not held, a detecting means for detecting a signal going through the WDM filter assembly, and a control means for applying a driving signal to drive the pivotal apparatus until the detected siganl is within a predetermined process tollerance, whereby the filter assembly is aligned with the collimator.

The system further includes a signal applying module for applying the signal going through the WDM filter assembly, a measurement means for displaying a characteristic of the detected signal to compare the detected signal with the target sginal, a detecting means support for supporting the detecting means, and a x-y movement means for moving the holding means and the pivotal means in either of a x-axis direction and a y-axis direction, wherein the WDM filter assembly is arranged at a location corresponding to the detecting means by the x-y movement means.

The collimator is held by the holding means. The holding means includes a groove for accepting the collimator and a fixing member for firmly fixing collimator. The holding means is fixed to the x-y movement means. The filter assembly has a hole, and the pivotal means includes a servomotor for providing a rotation, at least one worm gears geared with each other, a pivotal plate for rotating by the rotation transferred by the worm gear, a pin installed on the pivotal plate and fitted into the hole of the filter assembly. The x-y movement means includes a x-axis movement means and a y-axis movement means, the x-axis movement menas moving along a x-axis guide rail, the y-axis movement means moving along the y-axis movement means. The holding means is fixed on the y-axis movement means. The collimator has an optical fiber, and the signal applying module applies the signal going through the WDM filter assembly through the optical fiber. The filter assembly and the collimator are attached by an U.V. curable agent.

The system of assembling the WDM filter assembly has the following advantage: since stiffness of a pin offsets the tolerence between the lens and the filter assembly, an alignment between the filter assembly and the collimator can accurately be performed in a short time, preventing a lens of the collimator from being damaged by using the stiffness of the pin.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFFERED EMBODIMENTS

Reference will now be made in detail to preferred embodiments of the present invention, example of which is illustrated in the accompanying drawings.

Figure 1:
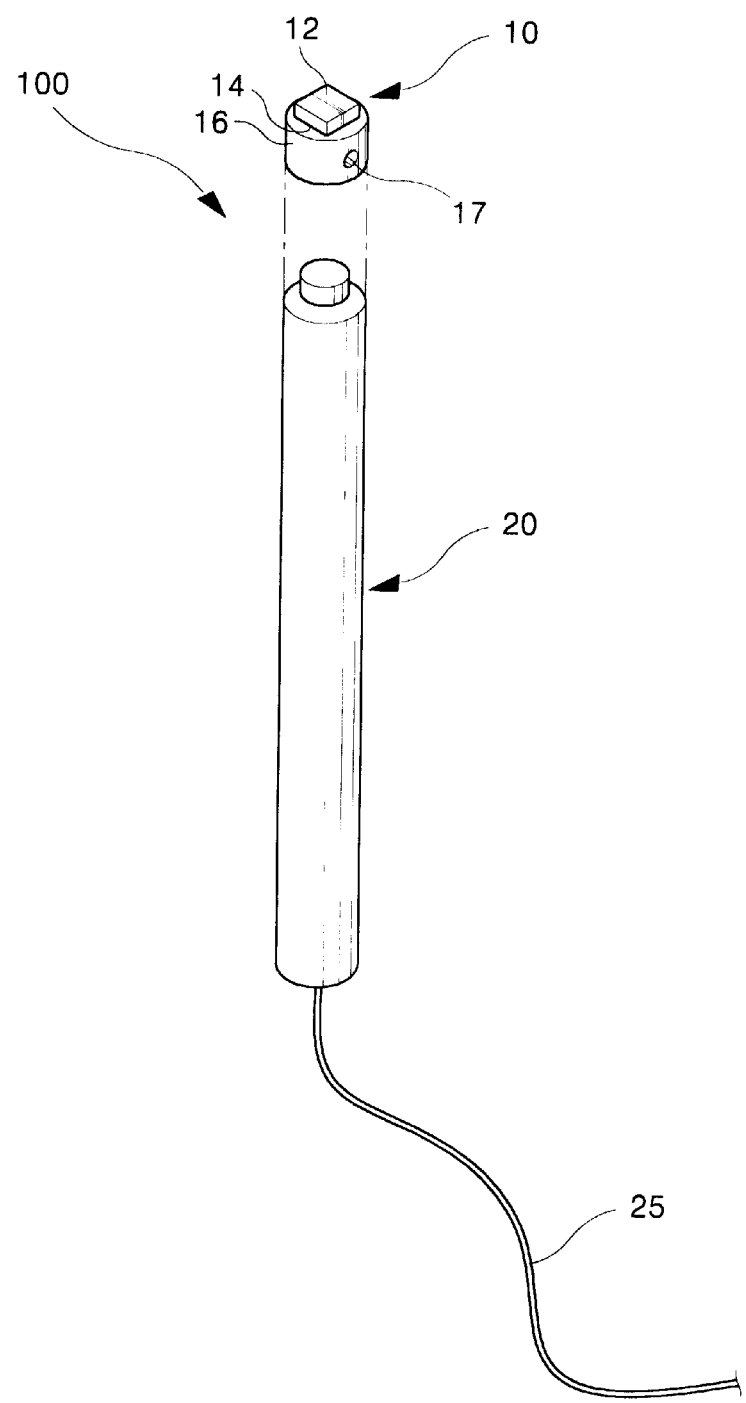
FIG. 1 is an exploded perspective view illustrating a WDM filter assembly according to the preferred embodiment of the present invention.

FIG. 1 is an exploded perspective view illustrating a WDM filter assembly according to the preferred embodiment of the present invention. The WDM filter assembly 100 includes a filter assembly 10 and a collimator 20. The filter assembly 10 includes a WDM filter 12, a silicon 14, and a filter 16. The WDM filter 12 and the filter 16 stick to each other by the silicon 14. The collimator 20 includes an optical fiber 25.

Figure 2:
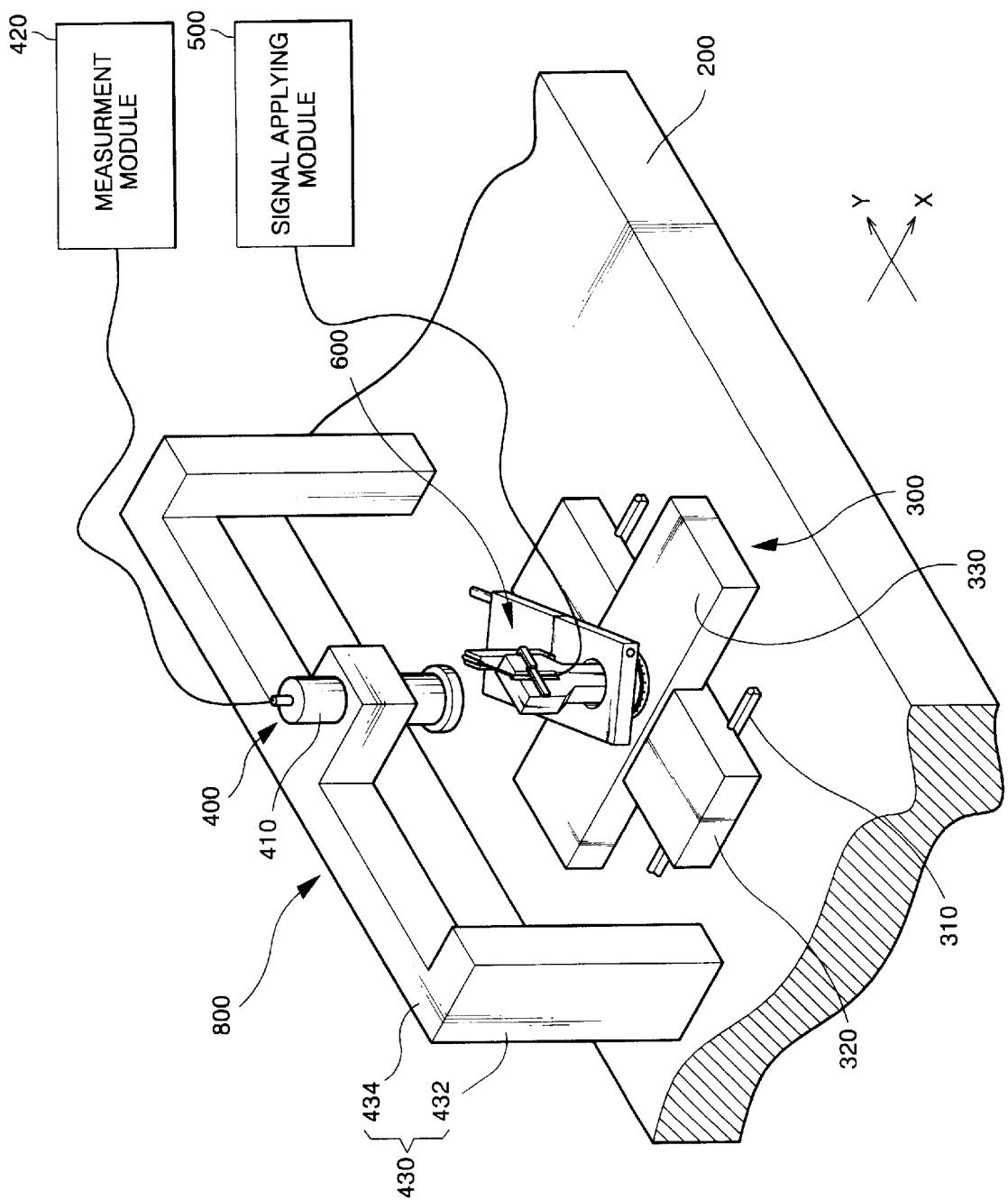
FIG. 2 is a perspective view illustrating a system of assembling a WDM filter assembly according to the preferred embodiment of the present invention.

FIG. 2 is a perspective view illustrating a system of assembling a WDM filter assembly according to the preferred embodiment of the present invention. The system 800 includes a base body 200, a X-Y movement module 300, a detecting module 400, a signal applying module 500, an alignment module 600, and a central processing unit (not shown) for controlling the system components described above.

The detecting module 400 is installed on an upper surface of the base body 200, and includes a detector 410, a measurement module 420, and a support frame 430. The support frame 430 includes a pair of support poles 432 that are spaced apart from each other at a predetermined distance and a detector support bar 434 that connects the support poles 432 to each other.

The detector 410 is supported through the support bar 434 and serves to detect characteristics of a signal that is inputted from the signal applying module 500 and goes through the WDM filter assembly 100. An output signal from the detector 410 is inputted to the measurement module 420 and then is displayed as a graph or a numerical value that indicates a characteristic of the WDM filter assembly 100 according to an input signal.

The X-Y movement module 300 is installed at a portion of the base body 200 corresponding to the detector 410. The X-Y movement module 300 includes a X-axis guide rail 310 that allows the X-Y movement module 300 to move to a X-direction, a X-axis movement means 320 that is installed on the X-axis guide rail 310, and a Y-axis movement means 330 that moves along the X-axis movement means 320.

Figure 3:
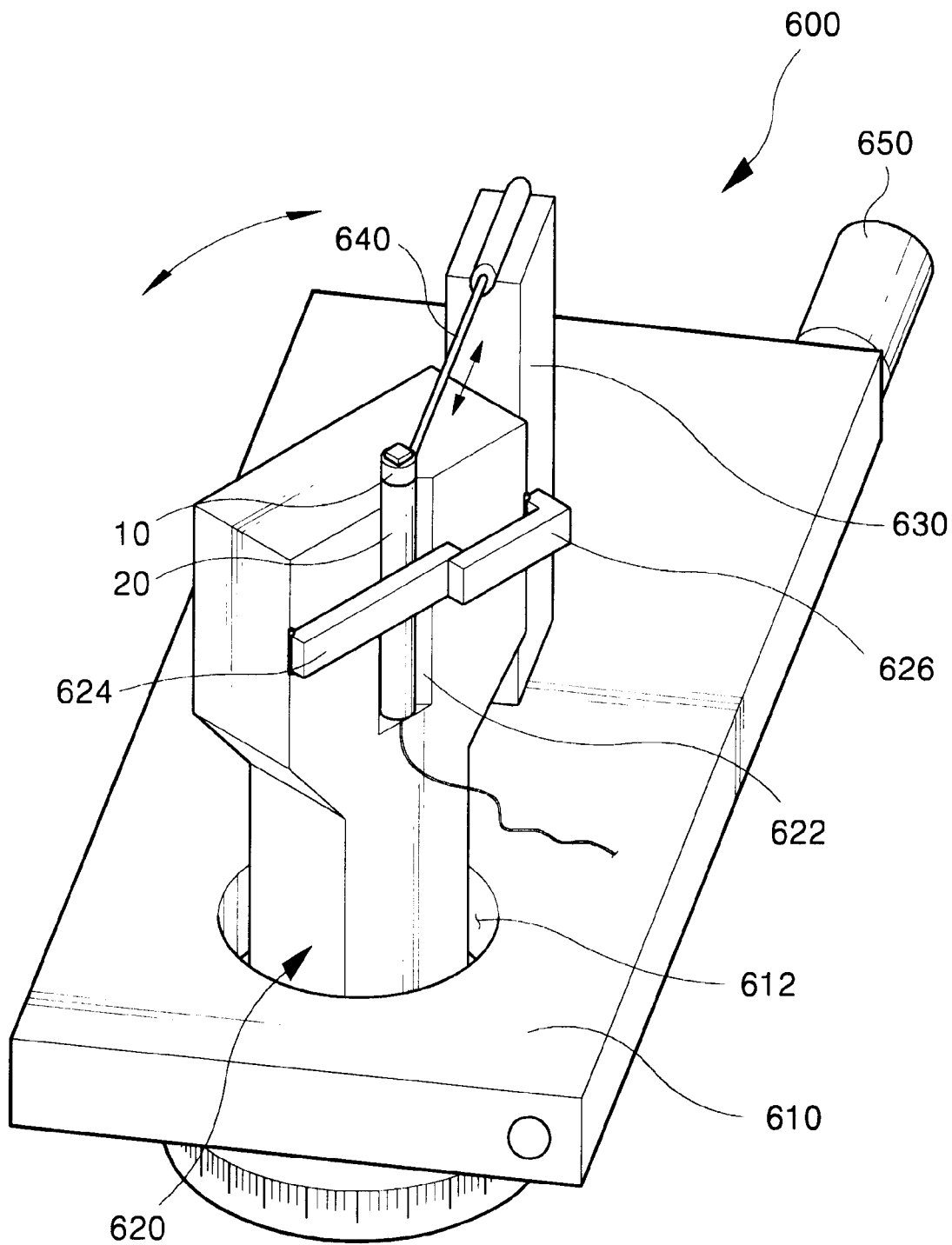
FIG. 3 is a perspective view illustrating an alignment module according to the preferred embodiment of the present invention.

The alignment module 600 is installed on the Y-axis movement means 330 to pivotally move. FIG. 3 is a perspective view illustrating the alignment module 600. The alignment module 600 of FIG. 3 includes a pivotal plate 610, a pivotal apparatus (not shown), a collimator holding module 620, an align pin support 630, and an align pin 640.

The pivotal plate 610 has a thin rectangular parallelepiped shape, and an opening portion 612 is formed at a central portion thereof.

The pivotal apparatus includes a worm wheel gear, a worm gear and a servomotor 650. The worm wheel gear is formed on the Y-axis movement means 330 in a ring shape. The worm gear is installed such that it is exposed from the opening portion 612 of the pivotal plate 610 to gear with the worm wheel gear in the state that the worm wheel gear is accepted in the opening portion 612 of the plate 610. The servomotor 650 is fixed to the pivotal plate 610 and is coupled to rotate the worm gear (not shown) through its shaft.

Therefore, when the servomotor 650 operates, the worm gear rotates, and then a rotation is transferred to the worm wheel gear. The worm wheel gear is fixed to the Y-axis movement means 330 and, therefore, the pivotal plate 610 rotates by the servomotor 650.

The collimator holding module 620 is fixed to the Y-axis movement means 330 through the opening portion 612 of the pivotal plate 610 in state that the pivotal plate 610 is fixed to the Y-axis movement means 330.

The collimator holding module 620 has a hexagonal cross-section. A collimator holding groove 622 having a triangular cross-section is formed on a front surface, and holding members 624 and 626 are arranged on both sides of the collimator holding module 620. The collimator 20 accepted in the collimator holding groove 622 is firmly held by the hold members 624 and 626.

Meanwhile, the pin support 630 is installed on the pivotal plate 610, and the pin 640 having a predetermined diameter is coupled onto the pin support 630. The pin 640 is fitted into a pinhole (see 17 in FIG. 1) of the filter assembly 10 that is temporally aligned with the collimator 20. Preferably, the pinhole 17 is formed for a most inner portion of the pinhole 17 to be an axis of the pivotal movement.

Hereinafter, a method of assembling the WDM filter 100 for an optical amplifier according to the preferred embodiment of the present invention is explained in detail.

First, the operator connects the optical fiber 25 of the collimator 20 to the signal applying module 500, fits the collimator 20 into the collimator holding groove 622 of the collimator holding module 620, and firmly fixes the collimator 20 by the holding members 624 and 626.

Thereafter, the WDM filter assembly 100 is temporally assembled with the collimator 20. One end portion of the pin 640 is fitted into the pinhole 17 of the filter assembly 10, and the other end portion is fixed to the pin support 630.

Figure 4:
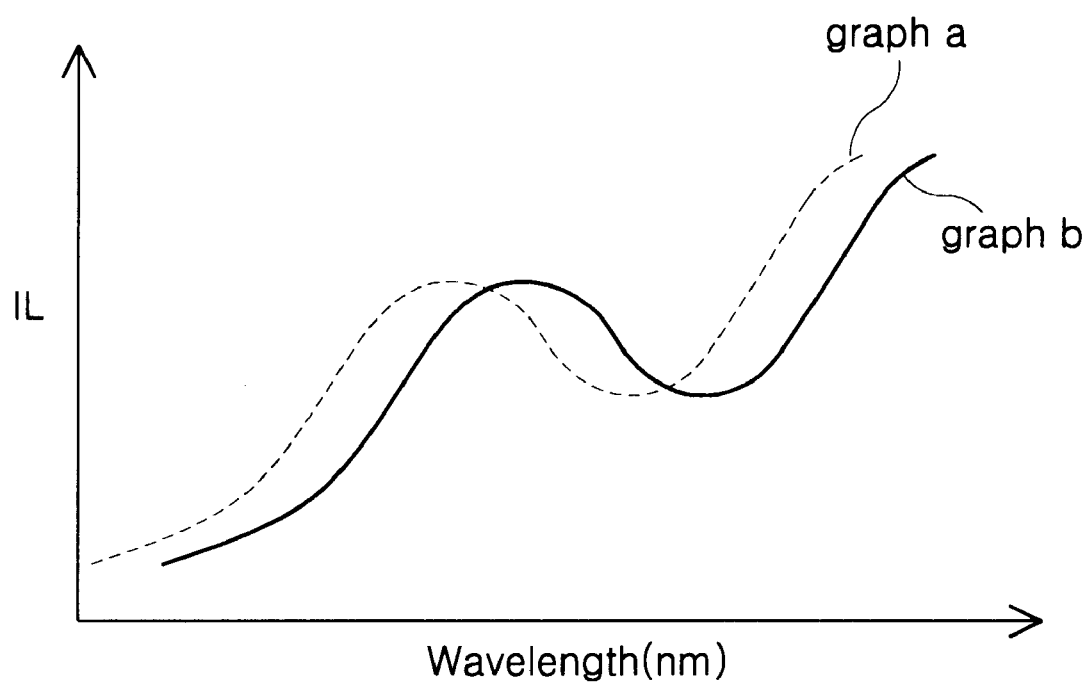
FIG. 4 is a graph illustrating a target signal and a detected signal according to the preferred embodiment of the present invention.

At this time, a signal that goes through the WDM filter assembly 100 is input to the measurement module 420 through the detector 410, whereby a graph of FIG. 4 is displayed. In FIG. 4, a signal "a" defined by a dotted line denotes a target signal, and a signal "b" defined by a solid line denotes a signal that goes through the WDM filter assembly 100.

Figure 5:
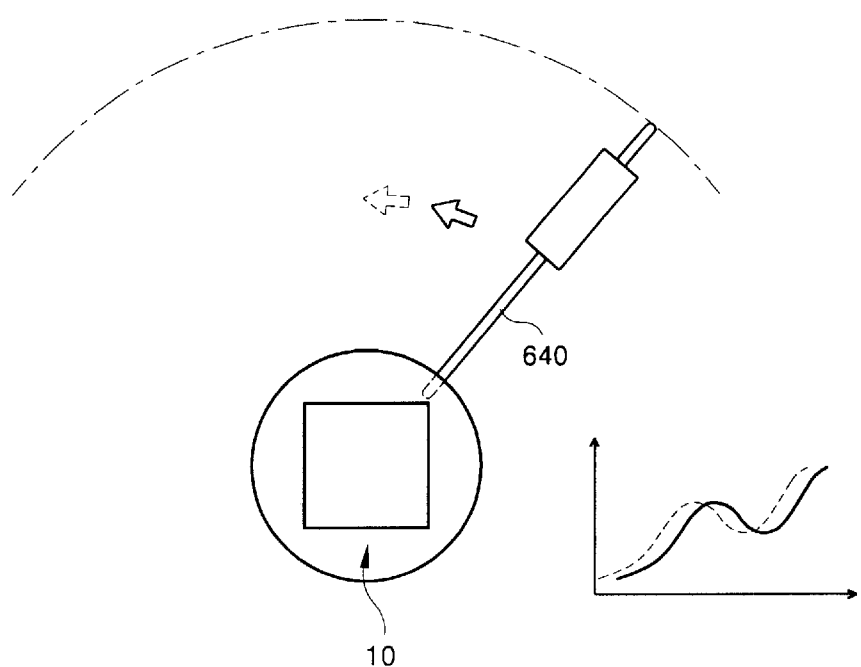
FIGS. 5 and 6 are graphs illustrating a method of assembling the WDM filter assembly according to the preferred embodiment of the present invention.
Figure 6:
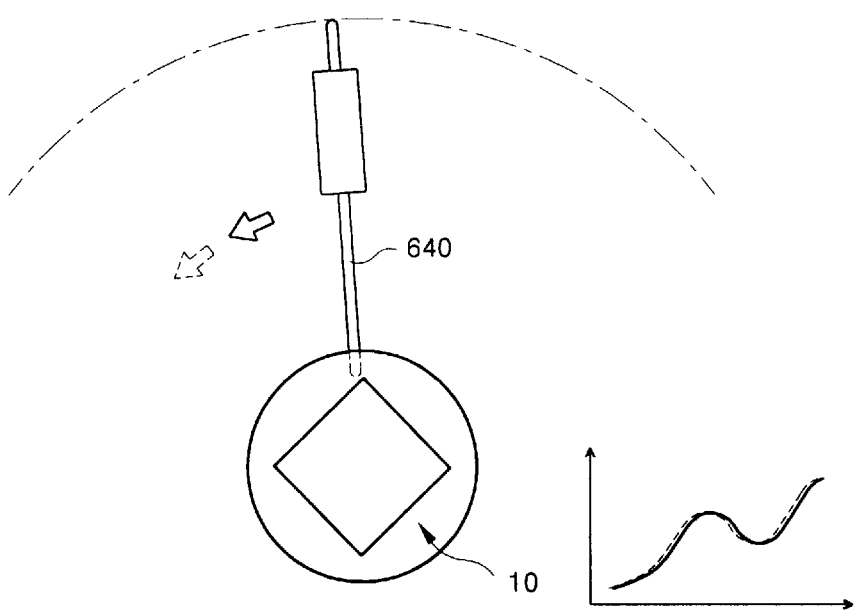

In order to accurately align the filter assembly 10 with the collimator 20, the signal that goes through the WDM filter assembly 100 has to have a characteristic of the target signal b. Therefore, the servomotor 650 operates at a predetermined speed, so that the pivotal plate 610, the pin support 630 and the pin 640 pivotally move as shown in FIG. 5. In FIG. 5, an arrow denotes a direction of a pivotal movement.

As the pin 640 pivotally moves, the filter assembly 10 pivotally moves to the same direction and angle as the align pin 640. At this time, the detector 410 detects signals changed according to a pivotal movement of the filter assembly 10 and transfers the detected signals to the central processing unit (not shown). The central processing unit applies a driving signal to the servomotor 650 until the detected signals are within a predetermined error range.

When the detected signal "b" is identical to the target signal "a" or the detected signal is within a predetermined error range, the central processing unit stops applying the driving signal to the servomotor 650, whereby an alignment between the filter assembly 10 and the collimator 20 is completed. Thereafter, the operator injects an adhesive between the filter assembly 10 and the collimator 20, and then irradiates the adhesive between the filter assembly 10 and the collimator 20 with, for example, a UV ray, whereby the filter assembly 10 and the collimator 20 firmly stick to each other.

As described herein before, the system of assembling the WDM filter assembly has the following advantage: an alignment between the filter assembly and the collimator can accurately be performed in a short time, preventing a lens of the collimator from being damaged.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for assembling a WDM filter assembly including a filter assembly and a collimator, comprising:
    a holding means for accepting and holding one of the filter assembly and the collimator;
    an aligning means including:
        an aligning pin for engaging a pin hole formed in one of the filter assembly and the collimator,
        pivotal means having a pin support on a pivotal plate and coupled to the aligning pin, for pivoting the aligning pin;
    a detecting means for detecting a signal going through the WDM filter assembly; and
    a control means for applying a driving signal to drive the pivotal means until the detected signal is within a predetermined process tolerance, whereby the filter assembly is aligned with the collimator.

2. The system of claim 1, further comprising, a signal applying module for applying the signal going through the WDM filter assembly.

3. The system of claim 1, further comprising, a measurement means for displaying a characteristic of the detected signal to compare the detected signal with the target sginal.

4. The system of claim 1, further comprising:
    a detecting means support for supporting the detecting means; and
    a x-y movement means for moving the holding means and the pivotal means in one of a x-axis direction and a y-axis direction,
    wherein the WDM filter assembly is arranged at a location corresponding to the detecting means by the x-y movement means.

5. The system of claim 4, wherein the collimator is held by the holding means.

6. The system of claim 5, wherein the holding means includes a groove for accepting the collimator and a fixing member for firmly fixing the collimator.

7. The system of claim 5, wherein the holding means is fixed to the x-y movement means.

8. The system of claim 7, wherein the filter assembly has the pin hole, and the pivotal means includes a worm wheel gear formed on a y-axis movement means of the x-y movement means, a worm gear installed such that it is exposed from an opening portion of the pivotal plate to mesh with the worm wheel gear, and a servomotor coupled to the pivotal plate for rotating the worm gear.

9. The system of claim 8, wherein the x-y movement means includes a x-axis movement means, the x-axis movement means moving along a x-axis guide rail, the y-axis movement means moving along the x-axis movement means.

10. The system of claim 9, wherein the holding means is fixed on the y-axis movement means.

11. The system of claim 2, wherein the collimator has an optical fiber, and the signal applying module applies the signal going through the WDM filter assembly through the optical fiber.

12. The system of claim 1, wherein the filter assembly and the collimator are attached by an U.V. curable agent.

13. A method of assembling a WDM filter assembly including a filter assembly and a collimator, the method comprising the steps of:
    temporally assembling the filter assembly to the collimator;
    holding one of the filter assembly and the collimator;
    fitting an aligning pin into a pin hole formed in the other one of the filter assembly and the collimator;
    detecting a signal going through the WDM filter assembly; and
    moving the aligning pin to rotate the other one of the filter assembly and collimator relative to the one of the filter assembly and the collimator until the detected signal is within a predetermined process tolerance, whereby the filter assembly is aligned with the collimator.

14. The method according to claim 13, wherein the one of the filter assembly and the collimator is the collimator and the other one of the filter assembly and the collimator is the filter assembly.

15. The method according to claim 13, further comprising the step of locking the filter assembly to the collimator to retain the filter assembly in alignment with the collimator.

* * * * *